April 3, 1934.  M. L. LEE  1,953,490
AUTOMOBILE KEY AND LICENSE HOLDER
Filed Sept. 26, 1933
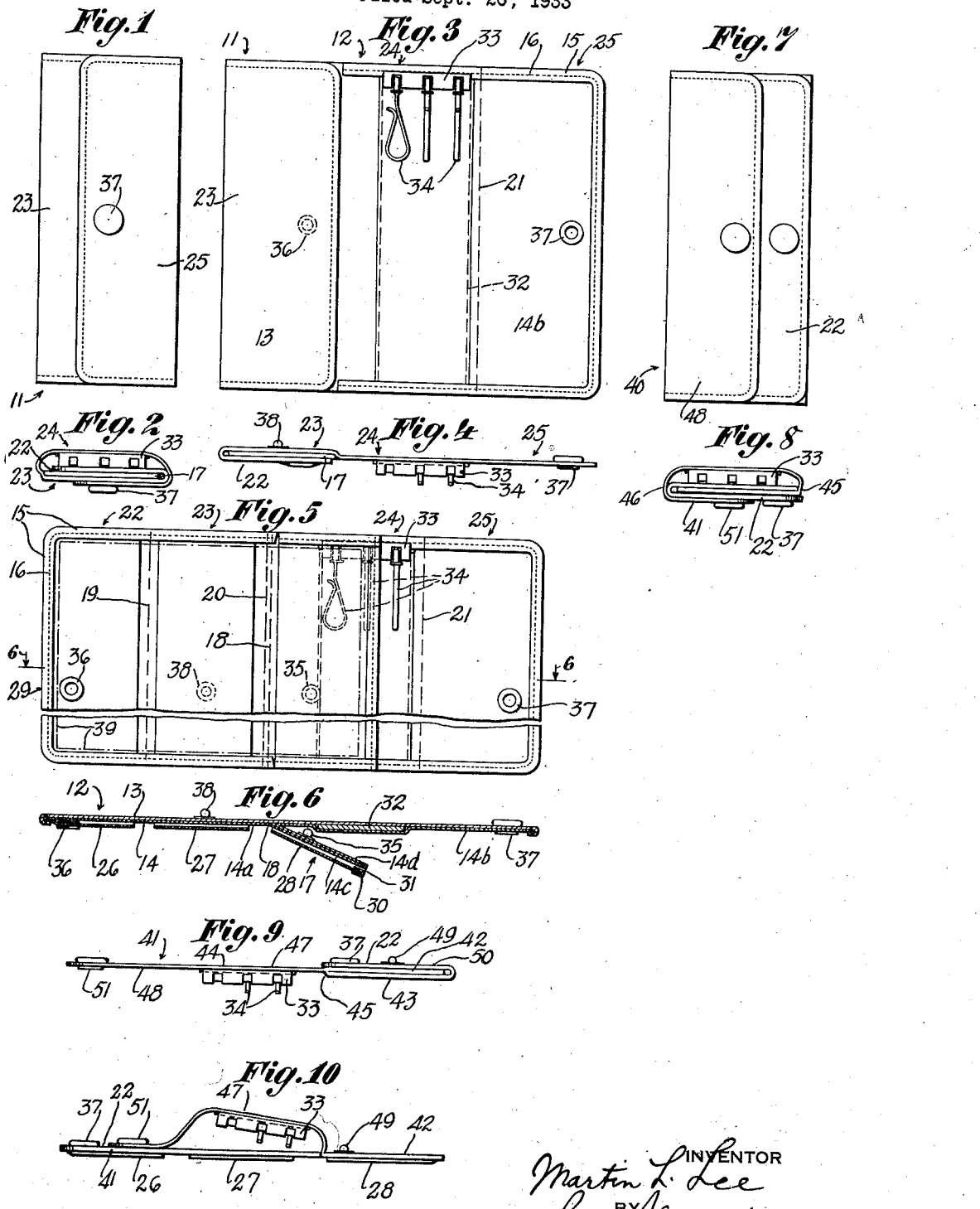

Patented Apr. 3, 1934

1,953,490

UNITED STATES PATENT OFFICE 1,953,490

AUTOMOBILE KEY AND LICENSE HOLDER

Martin L. Lee, Brooklyn, N. Y.

Application September 26, 1933, Serial No. 691,067

1 Claim. (Cl. 150—35.)

This invention relates to devices such as flexible pocket receptacles and has particular reference to an automobile key and driver's license holding device.

One object of the invention is to provide a device of the character described, having improved means for mounting a key or the like and for holding a ticket or license in display position and in such relation to each other that access may be had to the keys without opening the portion holding the license.

Another object of the invention is the provision of a device of the nature set forth having improved means including portions whereby access may be had to either the ticket or the keys, at will, by opening either portion and without opening the other, and the device being nevertheless arranged in a compact manner.

A further object of the invention is the provision of a device of the type mentioned having relatively few and simple parts, and which is inexpensive to manufacture, and reliable, durable, convenient, and efficient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claim, and illustrated in the annexed drawing, wherein like parts are designated by the same reference characters throughout the several views.

In the drawing:

Figure 1 is a plan view in closed position of a device embodying the invention.

Fig. 2 is an end view thereof.

Fig. 3 is a plan view of the device with the key holder portion open and the license holder portion closed.

Fig. 4 is an end view thereof.

Fig. 5 is a fragmentary plan view of the device completely open.

Fig. 6 is a sectional view taken on line 6—6 of Fig. 5.

Fig. 7 is a plan view in closed position of a modification of the invention.

Fig. 8 is an end view thereof.

Fig. 9 is an end view of the device with the key holder portion open and the license holder portion closed.

Fig. 10 is a similar view with the key holder portion closed and the license holder open.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 11 denotes a device embodying the invention. The same may include a back member 12 which may consist of an outer layer 13 of finished material and an inner lining layer 14, both layers being of a pliable material such as leather, fabric, or composition material transparent or opaque in nature. These layers may be continuously bound together along their edges, as by infolding of the outer layer at 15, and through stitching at 16. At a point intermediate of the ends of the back member, the inner layer 14 which may consist of two sections 14a and 14b may have extending portions 14c and 14d similarly united along their outer edges to form a panel or flap 17, which is swingable about a fold line 18 at its junction with the inner layer.

The back member 12 may have a plurality of transverse fold lines 19, 20, 21 of which two are disposed at one side of the panel hinge line 18, and the other at an apposite side thereof. If desired, the fold lines 18 and 20 may be in coincidence to form a single fold line. In this manner four sections 22, 23, 24, and 25 are provided. The sections 22, 23 and the panel 17 may have pocket forming portions such as strips of celluloid 26, 27, 28 respectively connected at their ends to the edges of the corresponding sections and panel, as under the bead portion 15. The strip 26 may be additionally secured to the section 22 along the free edge 29 thereof in the same manner. The strip 28 may have a reenforcement 30 at its outer longitudinal edge, which reenforcement may be folded over said edge and stitched thereto. It will be noted that the transparent holder strips are spaced from each other and from the adjacent fold lines 19, 20 of the back member. When the device is opened up flat, as shown in Fig. 5, the pockets afforded by said strips are in substantial alinement with each other so that a license ticket or other paper may be readily continuously inserted thereinto through the end opening 31 of the panel 17.

The section 24 may have a reenforcement strip 32 continuously adhesively secured between the layers 13 and 14b and intermediate of the fold lines. Affixed to the reenforcement 32 through the layer 14b is an article or key holder 33, which may be of a conventional type, and may have swiveled depending eyes or hooks 34 with which the keys may be removably engaged.

The panel 17 may have a headed stud 35 secured to the layer 14d on a face of the panel opposite to the transparent celluloid strip 28, and adapted for releasable engagement with a socket 36 that may be connected to the celluloid strip 26. The flap section 25 may have a socket member 37 secured thereto and adapted for releasable engagement with a stud member 38 secured to the outside of the section 23. It is noted that the snap fasteners do not interfere with the normal use of the device nor hinder insertion of the license ticket.

The manner of using the device will now be described. Upon inserting a license ticket such as 39 into sections 22, 23 and panel 17 through the opening 31 of the latter, in the flat open position of the device, the license is reliably retained without tear or breakage, and may be instantly inspected. Normally the license holder portion remains closed, as shown in Fig. 4, the panel being first infolded over section 23, and section 22 being folded over the panel, and the fastener elements 35, 36 interengaged. Nevertheless the key holder portion may be open, for convenient use of the keys, including the automobile key. When not in use, the section 24 is folded over the license holder portion to lie against section 22, and the flap portion 25 folded over section 23, and upon interengaging fastener elements 37, 38, a small compact package as shown in Fig. 1 is obtained. The keys will not affect the license, and are available without opening the license holder portion. The reenforcement 32 prevents marring by the keys of the outer layer 13 of the back member, as well as to reliably carry the key holder 33.

In Figs. 7 to 10 is shown a modification 40 of the invention wherein either the key holder portion or the license holder portion may be opened without opening the other. The construction is substantially similar in detail with the device 10, except that the key holder 33 is on a side of the back member 41 opposite to that on which the panel 42, corresponding to panel 17, is located. This necessitates that the outer finished layer of the back member shall include a surface section 43, and a surface section 44 on the opposite side, each extending from the hinge and fold line 45 to an opposite end of the back member. Moreover, the fold line at 45, and a fold line at 46, provide sections 47, 48 which are foldable reversely to sections 24, 25, as shown in Fig. 8. The stud 38 is located as shown at 49 on the outside of the flap member 50 in spaced relation to the fastener 37. The socket member 51 is located on an opposite face of the flap section 48, relative to that shown at 37.

In operation, it is noted that the license holder section may be kept closed, as shown in Fig. 9, and the section 44 may be folded thereover to lie against the surface 43 thereof, and then the flap section 48 may be folded over the flap section 22 of the license holder, and the fastener elements 49, 51 interengaged. The flap section 22 may extend beyond the flap section 48, as shown in Fig. 7, so as to afford easy access to both for opening either the key holder portion or the license holder portion individually as may be desired. Thus it will be noted that if access be desired to a license, bill, or the like, the flap 22 may be grasped and opened to render the same available without opening the key holder.

It will be appreciated that various changes and modifications may be made in the device as shown in the drawing, and that the same is submitted in an illustrative and not in a limiting sense, the scope of the invention being defined in the following claim.

I claim:

A device including a back member having a panel hingedly connected thereto, said back member having section defining fold lines at opposite sides of the hinge connection in spaced parallel relation thereto to form a license holder portion and a key holder portion on said opposite sides, the panel and two adjoining sections of the license holder portion having pockets adapted to register with each other and said pockets having transparent walls for displaying a license received therein, means for releasably interengaging said panel and that one of said pocket sections remote from the hinge connection, the key holder portion having a key holder mounted on a section adjoining said hinge line, means releasably interengaging a different section of the key holder portion and the outer face of that section of the license holder portion which adjoins the hinge connection, the sections of the license holder portion being foldable over each other with the panel therebetween, the sections of the key holder portion being foldable to substantially enclose the license holder portion.

MARTIN L. LEE.